July 9, 1940. W. A. KUENZLI 2,207,260
REFRIGERATION
Original Filed Dec. 31, 1935 3 Sheets-Sheet 2
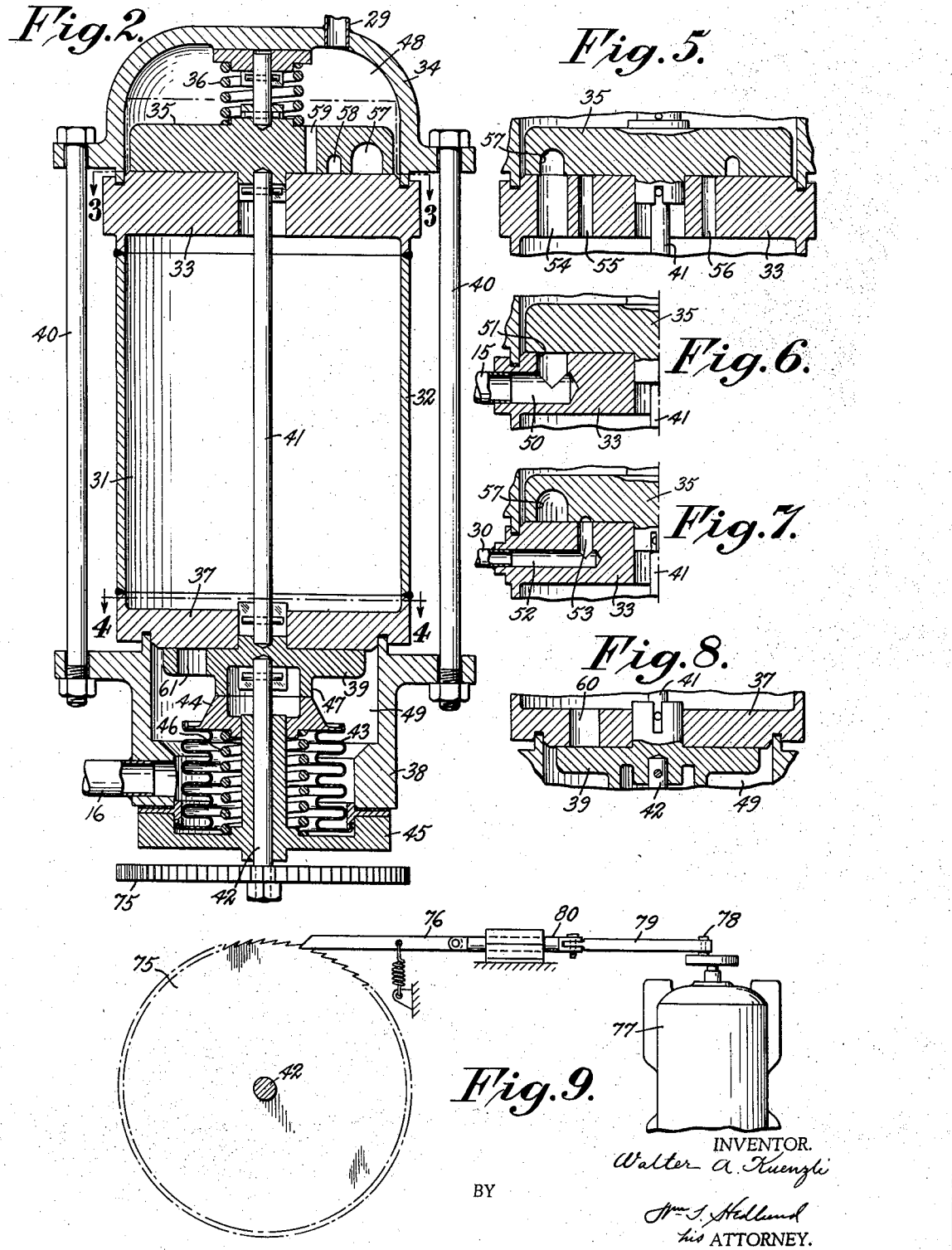
INVENTOR.
Walter A. Kuenzli
BY
his ATTORNEY.

July 9, 1940.  W. A. KUENZLI  2,207,260
REFRIGERATION
Original Filed Dec. 31, 1935  3 Sheets—Sheet 3
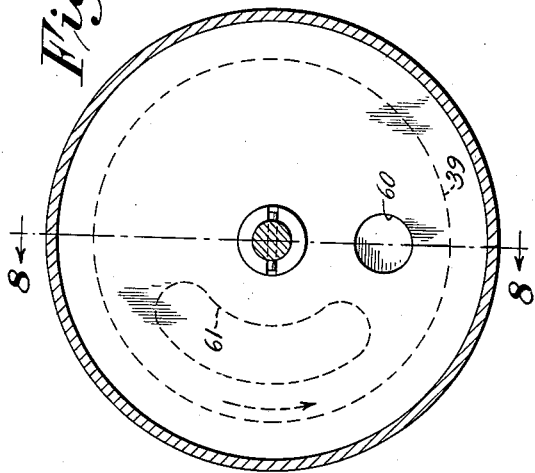
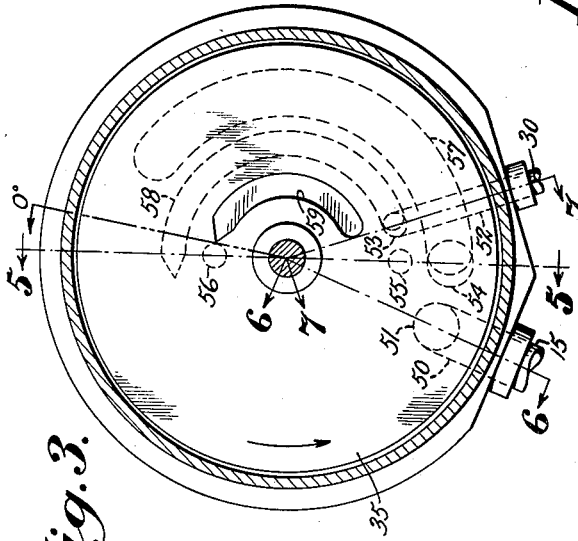
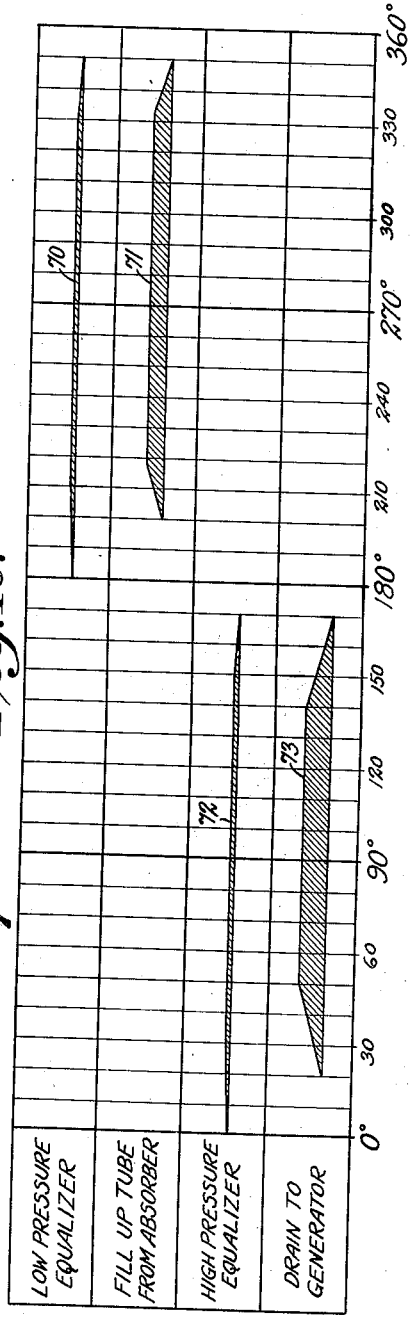
INVENTOR.
Walter A. Kuenzli
BY
Wm. J. Hedlund
his ATTORNEY.

Patented July 9, 1940

2,207,260

UNITED STATES PATENT OFFICE 2,207,260

REFRIGERATION

Walter A. Kuenzli, Evansville, Ind., assignor to Servel, Inc., New York, N. Y., a corporation of Delaware Application December 31, 1935, Serial No. 56,873
Renewed December 1, 1939

22 Claims. (Cl. 62—5)

My invention relates to refrigeration and more particularly to a refrigeration system of the absorption type.

It is an object of my invention to provide, in general, improved control of circulation of absorption liquid between a generator and an absorber of an absorption type refrigeration system, and, more particularly, an improved apparatus for and method of transferring absorption liquid in an absorption refrigeration system of a transfer vessel type.

My invention is concerned especially with transfer of liquid from an absorber to a generator. In general, I provide for automatically transferring a given quantity of liquid, and instigate such automatic transfer responsive to change in a condition in the system, and repeat initiation of such transfer until said condition is satisfied.

A fuller understanding of the invention may be had upon consideration of the following description and the accompanying drawings forming part of this specification and of which:

Fig. 2 is a sectional view of the transfer vessel shown in Fig. 1.

Fig. 3 is a detail sectional view of the transfer vessel taken on line 3—3 in Fig. 2;

Fig. 4 is a detail sectional view taken on line 4—4 in Fig. 2;

Fig. 5 is a detail sectional view taken on line 5—5 in Fig. 3;

Fig. 6 is a detail sectional view taken on line 6—6 in Fig. 3;

Fig. 7 is a detail sectional view taken on line 7—7 in Fig. 3;

Fig. 8 is a detail sectional view taken on line 8—8 in Fig. 4;

Fig. 9 is a detail view taken on line 9—9 in Fig. 1; and

Fig. 10 is a valve opening chart for the several valves associated with the transfer vessel.

Figure 1:
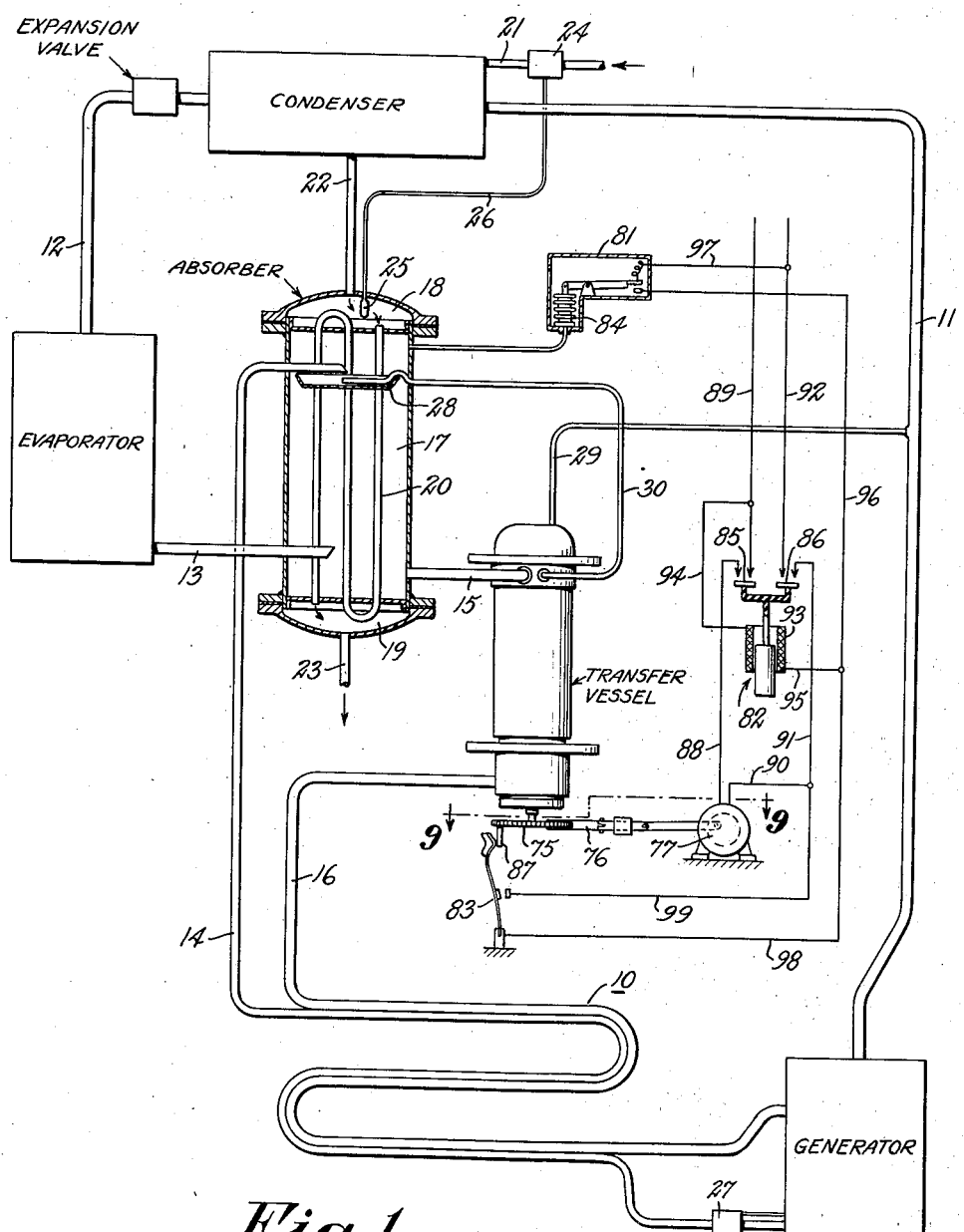
Fig. 1 is a more or less diagrammatic view of a refrigeration system embodying my invention.

Referring to Fig. 1 there is shown more or less diagrammatically a refrigeration system of what may be referred to as a transfer vessel type, including a generator, a condenser, an evaporator, an absorber, a transfer vessel, and a liquid heat exchanger 10. The generator is connected to the condenser by a conduit 11. The condenser is connected to the evaporator by a conduit 12. The evaporator is connected to the absorber by a conduit 13. The generator is connected to the absorber by means of a conduit 14. The absorber is connected to the transfer vessel by means of a conduit 15. The transfer vessel is connected to the generator by means of a conduit 16. The conduits 14 and 16 are arranged in thermal exchange relation to form the liquid heat exchanger 10.

The absorber has a central chamber 17 and two end chambers or headers 18 and 19. The headers 18 and 19 are connected by means of a serpentine conduit or cooling coil 20 located in the central chamber 17. The condenser and absorber are water-cooled. Water flows into the condenser through a conduit 21. From the condenser, water flows through a conduit 22 into the upper header 18 of the absorber, thence through the coil 20 into the lower header 19, and thence to waste or to a cooling tower through conduit 23. Flow of cooling water through conduit 21 into the condenser is controlled by a suitable valve 24 responsive to temperature of the cooling water in the upper header 18 of the absorber in which is located a thermostat 25 which is connected by means of a conduit 26 to the valve 24.

The system contains a suitable refrigerant fluid such as ammonia, and an absorption liquid such as water. Ammonia vapor is expelled from solution in the generator by heat and flows through conduit 11 to the condenser. The ammonia vapor liquefies in the condenser and flows through conduit 12 to the evaporator. Flow of liquid from the condenser to the evaporator is suitably controlled as by means of an expansion valve in conduit 12. In the evaporator, liquid ammonia evaporates and flows through conduit 13 into the absorber. Weakened absorption liquid flows from the generator through conduit 14 to the absorber. Flow of liquid through conduit 14 is suitably controlled as by means of a thermostatically operated valve 27 responsive to temperature of the generator. Weakened absorption liquid issuing from the upper end of conduit 14 enters a shallow vessel or tray 28 from which it overflows into the main chamber 17 of the absorber. In the absorber, ammonia vapor is absorbed into the weakened absorption liquid, and the resulting enriched absorption liquid flows, in a manner hereinafter described, through conduit 15 into the transfer vessel, and thence through conduit 16 to the generator.

In addition to the previously described connections, there are also provided two conduits which may be referred to as pressure equalizing conduits. One of these is a high pressure equalizing conduit 29 having one end connected to the transfer vessel and the other end connected to conduit 11. The other is a low pressure equalizing conduit 30 of which one end is connected to the transfer vessel and the other end extends into the absorber and opens within the tray 28, so that this opening is submerged in absorption liquid in the tray.

The generator and condenser which are connected by conduit 11 are in the high pressure side of the refrigeration system. This is briefly termed the high side. The evaporator and absorber are in the low pressure side of the refrigeration system. This is shortly termed the low side. The high and low side of the refrigeration system are segregated by the expansion valve, the weak liquid control valve 27, and certain valves associated with the transfer vessel to be described. Weak liquid flows from the generator to the absorber through conduit 14 under the control of valve 27 on account of the difference in pressures in the high and low sides of the system.

It is the function of the transfer vessel to deliver enriched absorption liquid from the absorber in the low side to the generator in the high side. To accomplish this, the transfer vessel is first segregated from the high side and connected to the low side. During this time, liquid may flow by gravity from the absorber through conduit 15 into the transfer vessel. Then the transfer vessel is segregated from the low side and connected to the high side, whereupon liquid may flow by gravity from the transfer vessel through conduit 16 to the generator. During this time, the pressure in the transfer vessel is equalized with that in the generator by admission into the transfer vessel of high pressure vapor from conduit 11 through the high pressure equalizing conduit 29. When the transfer vessel is again segregated from the high side and connected to the low side, the pressure in the transfer vessel is equalized with that in the absorber by escape of high pressure vapor from the transfer vessel through the low pressure equalizing conduit 30 into the tray 28 where it is absorbed by absorption liquid in this tray. It will be understood that the pressure in the low side may be decreased by increasing the rate of flow of enriched absorption liquid from the absorber, and thereby permit evaporation of liquid in the evaporator at a desired low temperature.

I will now describe the structure of the transfer vessel with more particular reference to Figs. 2 to 8 inclusive. As may be seen in Fig. 2, the transfer vessel comprises a liquid accumulation chamber 31 formed by a cylindrical casing 32. The upper end of the casing 32 is closed by what will be termed an upper valve plate 33. Over the upper valve plate 33 is an upper valve casing 34. Within the upper valve casing 34 is what will be termed a valve disc 35. The valve disc 35 is rotatably seated on the upper surface of the valve plate 33 and is resiliently maintained in contact therewith by means of a spring 36 which is compressed between the valve disc 35 and the valve casing 34. The lower end of the cylindrical casing 32 is closed by what will be referred to as a lower valve plate 37. Over the valve plate 37 is placed a lower valve casing 38. Within the valve casing 38 is a lower valve disc 39. The valve casings 34 and 38 are secured in place by means of long bolts 40 which extend through holes in the flanged edges of the valve casings 34 and 38 which extend beyond the edge of the cylindrical casing 32. The valve discs 35 and 39 are connected by means of a rod 41 which extends centrally through the valve plates 33 and 37 and the liquid accumulation chamber 31. To rotate the valve discs 35 and 39, there is provided a shaft 42 of which one end is connected to the lower valve disc 39 and the other end extends through the lower valve casing 38. A seal for the operating shaft 42 is provided by means of a bellows 43. The upper end of the bellows 43 is connected to a sealing ring 44 and the lower end of the bellows 43 is connected to a cap or head 45 on the lower valve casing 38. A coil spring 46 within the bellows 43 is compressed between the head 45 of the valve casing 38 and the sealing ring 44, whereby the sealing ring 44 is maintained in engagement with a rim or shoulder 47 on the lower valve disc 39, and the latter is rotatably seated against the lower valve plate 37. The space beneath the valve casing 34 will be referred to as the upper valve chamber 48, and the space under the lower valve casing 38 will be referred to as the lower valve chamber 49.

The upper valve plate 33 is provided with a first passage 50 terminating in a valve opening 51 in the upper face of the valve plate 33. There is also a second valve passage 52 which terminates in a valve opening 53 in the upper surface of the valve plate 33 somewhat nearer to the center of the valve plate than the valve opening 51. The valve passages and openings just described may be seen in Figs. 3, 6, and 7. Adjacent the valve opening 51 there is a valve passage 54 which extends through the valve plate 33 into the chamber 31. Adjacent the valve opening 53 is a valve passage 55 which also extends through the valve plate 33 into the chamber 31. Diagonally opposite from the valve passage 55, and further toward the center of the valve plate 33 is a third valve passage 56 which also extends through the valve plate 33 into the chamber 31. In the upper valve disc 35 there is a first valve groove 57, a second valve groove 58, and a valve slot 59. The first valve groove 57 is arranged to open communication between the valve opening 51 and the valve passage 54 over a predetermined distance of rotation of the valve disc 35. The second valve groove 58 is arranged to open communication between the valve opening 53 and the valve passage 55 over a certain distance of rotation of the valve disc 35. The valve slot 59 is arranged to open communication between the upper valve chamber 48 and the valve passage 56 over a certain distance of rotation of the valve disc 35.

The lower valve plate 37 is provided with a valve passage 60. The lower valve disc 39 is provided with a valve slot 61 which is arranged to open communication between the valve passage 60 and the lower valve chamber 49 over a certain distance of rotation of the valve disc 39.

Referring also to Fig. 1, conduit 15, which may be referred to as a fill up tube from the absorber, is connected to the passage 50 in the upper valve plate 33. The low pressure equalizing conduit 30 is connected to the valve passage 52 in the upper valve plate 33. The high pressure equalizing conduit 29 is connected to the upper valve chamber 48. The conduit 16, which may be referred to as the drain to the generator, is connected to the lower valve chamber 49.

When the valve discs 35 and 39 are in their normal or standstill positions, as illustrated in Figs. 2, 3, and 4, the valve opening 51 and the valve passages 55, 56, and 61 are closed, so that the transfer vessel is segregated from both the high side and low side. Assume now the valve discs 35 and 39 make one rotation in a counter-clockwise direction, as indicated by the directional arrows in Figs. 3 and 4. The valve slot 59 in the upper disc 35 meets the valve passage 56 in advance of the opening of valve passage 60 by the valve slot 61 in the lower disc 39. Thereupon, high pressure vapor from conduit 29 enters the transfer vessel chamber 31 by way of the upper valve chamber 48, valve slot 59, and valve passage 56. The pressure in the transfer vessel being thus equalized with that of the high side, liquid in the transfer vessel may flow therefrom through valve passage 60, valve slot 61, the lower valve chamber 49, and the drain conduit 16 to the generator. This transfer from the transfer vessel to the generator occurs during one-half revolution of the valve discs 35 and 39. Immediately after the valve passage 56 and the valve passage 60 have been closed by the upper disc 35 and the lower disc 39 respectively, the valve groove 58, now overlying the valve passage 55, meets the valve opening 53, and shortly thereafter, the valve groove 57, now overlying the valve opening 51, meets the valve passage 54. Thereupon, high pressure vapor flows from the transfer vessel chamber 31 through valve passage 55, valve groove 58, valve opening 53, passage 52, and the low pressure equalizing conduit 30 into the absorber where it is absorbed by liquid in the overflow tray 28. The pressures in the transfer vessel and the absorber now being equalized, enriched absorption liquid flows from the absorber through conduit 15, passage 50, valve opening 51, valve groove 57, and valve passage 54 into the transfer vessel chamber 31. When the valve disc 35 and 39 return to their starting position, as shown in Figs. 2, 3, and 4, all of the valves are closed and the pressure vessel is again segregated from both the high and low side. It will now be understood that during one revolution of valve discs 35 and 39 a certain quantity of liquid flows from the transfer vessel to the generator, and is replaced by a quantity of liquid which flows from the absorber into the transfer vessel.

For convenience, I have shown in Fig. 10 a valve opening chart, showing the open and closed periods of the four valves during one complete revolution of the valve discs 35 and 39 which may be referred to as a cycle of operation of the transfer device. The shaded area 70 shows the time and amount of opening of the valve controlling the low pressure equalizing conduit 30. The shaded area 71 shows the time and amount of opening of the valve controlling the overflow tube 15 from the absorber. The shaded area 72 shows the time and amount of opening of the valve controlling the high pressure equalizing conduit 29. The shaded area 73 shows the time and amount of opening of the valve controlling the drain conduit 16 to the generator. Referring now to Figs. 1, 2, and 9, I provide for revolving the transfer vessel valve discs one turn at a time responsive to pressure in the absorber. It will be understood that, especially in the case of a water-cooled condenser which operates at a substantially constant temperature, by maintaining the absorber pressure substantially constant, the evaporator pressure, and therefore the refrigeration temperature, will be maintained substantially constant. On the transfer vessel drive shaft 42 is a ratchet wheel 75 operated by a reciprocable pawl 76. An electric motor 77 is connected by means of a crank 78, a connecting rod 79, and a slide bar 80 to operate the pawl 76 to revolve the ratchet wheel 75 one notch for each revolution of the motor 77. Thus, the valve operation speed may be reduced from the speed of the motor by a ratio determined by the number of notches on the wheel 75 and the throw of the crank 78. It will be understood that any desired speed reducing arrangement may be utilized such as gear trains or a combination of gear trains and ratchet.

Referring now more particularly to Fig. 1, the motor 77 is controlled by a circuit including a pressure operated switch 81, a solenoid operated switch 82, and a limit switch 83. The switch 81 may be any suitable type of snap switch operated by a pressurestat 84 which is connected to the absorber. The switch 81 is preferably adjustable, although adjusting means have not been shown, so that this switch opens below a predetermined absorber pressure and closes above such predetermined pressure. The solenoid operated switch 82 is provided with two sets of contacts 85 and 86. The limit switch 83 is of a normally closed type and is arranged to be opened by an arm 87 on the ratchet wheel 75. Thus, limit switch 83 is open in only one position of the ratchet wheel 75. This position is the desired inactive position of the previously described transfer vessel valves.

One terminal of the motor 77 is connected by a conductor 88 and the contacts 85 of the solenoid switch 82 to one side 89 of a current supply line. The other terminal of the motor 77 is connected by means of a conductor 90, a conductor 91, and the contacts 86 of the solenoid switch 82 to the other side 92 of the supply line. It will now be understood that when the solenoid switch 82 is operated, the motor 77 is energized and drives the ratchet wheel 75 to turn the transfer vessel valves. One terminal of the operating coil 93 of the solenoid operated switch 82 is connected by means of a conductor 94 to the conductor 89 of the supply line. The other terminal of the switch coil 93 is connected by means of a conductor 95, a conductor 96, the pressure operated switch 81, and a conductor 97 to the other side 92 of the supply line. The same terminal of the switch coil 93 is also connected by means of the conductor 95, a conductor 98, the limit switch 83, a conductor 99, the conductor 91, and solenoid switch contacts 86 to the conductor 92 of the supply line. It will now be understood that the solenoid switch 82 will be energized as long as the pressure operated switch 81 is closed, and that when the pressure operated switch 81 is open, the solenoid switch 82 will be energized only as long as the limit switch 83 is closed.

Assuming that the pressure in the absorber is below a certain value, the switches 81, 82, and 83 are all open as illustrated in Fig. 1. Upon a certain rise in pressure in the absorber, the switch 81 will close to energize the solenoid operated switch 82 which thereupon operates and starts the motor 77. The motor 77 turns the transfer vessel valves as previously described. While the arm 87 is turning with the ratchet wheel 75, the limit switch 83 is closed, thus maintaining the energization of the solenoid switch 82 even though the pressure switch 81 opens in the meanwhile. When the arm 87 on the ratchet wheel 75 has made a complete revolution, it again opens the limit switch 83. This deenergizes the solenoid switch 82 providing that the pressure switch 81 has opened. If the pressure switch 81 has not opened, operation of the limit switch 83 has no effect, and the transfer vessel valves are rotated through another turn. Thus, the transfer vessel valves continue to rotate as long as the pressure switch 81 is closed, and strong solution is thus transferred out of the absorber until the pressure therein drops to the desired value. Thereupon, the pressure switch 81 opens and the motor 77 is deenergized the next time the arm 87 on the ratchet wheel 75 opens the limit switch 83. It will be understood that this method of control is applicable to any type of device for transferring liquid from the absorber to the generator. For instance, the motor 77 may be connected to a pump for pumping liquid from the low pressure absorber to the high pressure generator.

Various changes and modifications may be made within the scope of my invention which is therefore not limited except as set forth in the following claims.

What is claimed is:

1. In an absorption refrigeration system, an automatic liquid transfer device having a regulated period of operation independent of any condition in said system, and means for instigating operation of said device responsive to a condition in said system.

2. In an absorption refrigeration system, a liquid transfer device, means for automatically timing a period of operation of said device independently of any condition in said system, and means for instigating operation of said device responsive to a condition in the refrigeration system.

3. In an absorption refrigeration system including an absorber and a liquid transfer device, means for automatically timing a period of operation of said device, and means for instigating operation of said device responsive to pressure in said absorber.

4. In an absorption refrigeration system having a transfer vessel, valves for controlling connections to said vessel, means for automatically timing a cycle of operation of said valves independently of any condition in said system, and means for instigating operation of said valves responsive to a condition in the refrigeration system.

5. In an absorption refrigeration system having an absorption liquid transfer vessel, valves controlling the connections to said transfer vessel, electrically operated means for operating said valves, and a circuit for said electrically operated means including a control switch for completing said circuit responsive to a condition in the refrigeration system, and a limit switch in parallel with said control switch for opening said circuit only when said control switch is open and after predetermined operation of said electrically operated means.

6. In an absorption refrigeration system, a liquid transfer device, an electric motor for operating said device, and an energizing circuit for said motor controlled by two switches in parallel, one of said two switches being operative responsive to pressure in the refrigeration system, and the other of said two switches being operative responsive to predetermined operation of said device.

7. In an absorption refrigeration system, a liquid transfer device, an electric motor for operating said device, a solenoid operated switch for controlling said motor, and an energizing circuit for said solenoid switch including two switches in parallel, one of said two switches being operative responsive to a condition in the refrigeration system, and the other of said two switches being operative responsive to predetermined operation of said device.

8. In an absorption refrigeration system, a transfer vessel having connections for inlet and outlet of liquid and high and low pressure equalizing connections, means to open said liquid outlet and high pressure equalizing connection and alternately close said last connections and open said liquid inlet and low pressure equalizing connection in a predetermined cycle of operation of said means, an electric motor for operating said means, a solenoid operated switch for controlling said motor, and an energizing circuit for said solenoid switch including two switches in parallel, one of said two switches being operative responsive to pressure in the refrigeration system, and the other of said two switches being operative each said cycle of operation of said means.

9. Absorption refrigeration apparatus having a liquid transfer device comprising a vessel having connections for inlet and outlet of liquid and high and low pressure equalizing connections, a plurality of valves constructed and arranged to first open said liquid outlet and high pressure equalizing connection and then close said last connections and open said liquid inlet and low pressure equalizing connection each cycle of operation of said valves, and means for operating said valves through a number of complete cycles dependent upon a condition in the refrigeration apparatus.

10. Absorption refrigeration apparatus having a liquid transfer device comprising a vessel having connections for inlet and outlet of liquid and high and low pressure equalizing connections, rotatable valves constructed and arranged to first open said liquid outlet and high pressure equalizing connection and then close said last connections and open said liquid inlet and low pressure equalizing connection each revolution of said valves, and means for turning said valves through a number of complete revolutions dependent upon a condition in the refrigeration apparatus.

11. In a liquid transfer device for absorption refrigeration apparatus, an upright cylindrical casing, a valve plate closing each end of said casing, a valve disc revolvably seated on each valve plate, a valve casing over each of said valve discs and forming with said valve plates a valve chamber at each end of said cylindrical casing, connections for inlet and outlet of liquid, high and low pressure equalizing connections, said valve plates and discs being constructed and arranged to first open said liquid outlet and high pressure equalizing connection and then close said last connections and open said liquid inlet and low pressure equalizing connection each revolution of said valve discs, and means for turning said valve discs.

12. In a liquid transfer device for absorption refrigeration apparatus, an upright cylindrical casing, a valve plate closing each end of said casing, a valve disc revolvably seated on the outer side of each valve plate, a shaft extending centrally through said casing and valve plates and operably connecting said valve discs, a valve casing over each of said valve discs and forming with said valve plates a valve chamber at each end of said cylindrical casing, connections for inlet and outlet of liquid, high and low pressure equalizing connections, said valve plates and discs being constructed and arranged to first open said liquid outlet and high pressure equalizing connection and then close said last connections and open said liquid inlet and low pressure equalizing connection each revolution of said valve discs, and means for turning said valve discs.

13. In a liquid transfer device for absorption refrigeration apparatus, an upright cylindrical casing, a valve plate closing each end of said casing, a valve disc revolvably seated on the outer side of each valve plate, a shaft extending centrally through said casing and valve plates and operably connecting said valve discs, a valve casing over each of said valve discs and forming with said valve plates a valve chamber at each end of said cylindrical casing, a drive shaft for rotating said valve discs connected to one of said discs and extending through one of said valve casings, a seal for said drive shaft comprising a bellows having one end joined to said valve casing around the drive shaft opening therethrough and a bearing ring joined to the other end of the bellows and rotatably seated on a valve disc around said drive shaft, connections for inlet and outlet of liquid, high and low pressure equalizing connections, said valve plates and discs being constructed and arranged to first open said liquid outlet and high pressure equalizing connection and then close said last connections and open said liquid inlet and low pressure equalizing connection each revolution of said valve discs, and operating means connected to said drive shaft.

14. In a liquid transfer device for absorption refrigeration apparatus, an upright cylindrical casing, a valve plate closing each end of said casing, a valve disc revolvably seated on the outer side of each valve plate, a shaft extending centrally through said casing and valve plates and operably connecting said valve discs, a valve casing over each of said valve discs and forming with said valve plates a valve chamber at each end of said cylindrical casing, a drive shaft for rotating said valve discs connected to one of said discs and extending through one of said valve casings, a seal for said drive shaft comprising a bellows having one end joined to said valve casing around the drive shaft opening therethrough and a bearing ring joined to the other end of the bellows and rotatably seated on a valve disc around said drive shaft, connections for inlet and outlet of liquid, high and low pressure equalizing connections, said valve plates and discs being constructed and arranged to first open said liquid outlet and high pressure equalizing connection and then close said last connections and open said liquid inlet and low pressure equalizing connection each revolution of said valve discs, an electric motor connected to said drive shaft, a pressure operated switch for instigating operation of said motor, and a switch for continuing operation of said motor to complete a revolution of said valve discs upon opening of said pressure operated switch.

15. In an absorption refrigeration system, a liquid transfer device having a regulated period of operation, and means for instigating operation of said device responsive to a condition in said system and permitting said device successive regulated periods of operation until said condition is satisfied.

16. In an absorption refrigeration system, a liquid transfer device, means for timing a period of operation of said device, and means for instigating operation of said device responsive to a condition in the refrigeration system and preventing said timing means from becoming effective to terminate operation until said condition is satisfied.

17. In an absorption refrigeration system having a transfer vessel, valves for controlling connections to said vessel, means for timing a cycle of operation of said valves, and means for instigating operation of said valves responsive to a condition in the refrigeration system and preventing said timing means from becoming effective to terminate operation of said valves until said condition is satisfied.

18. A method of transferring liquid from one place to another in an absorption refrigeration system which includes transferring a measured quantity of liquid responsive to a condition in the system, and successively transferring measured quantities of liquid until said condition is satisfied.

19. In an absorption refrigeration system, a liquid transfer device operative to transfer a certain quantity of liquid in a limited operating period, and means for instigating operation of said device responsive to a condition in said system and causing successive operating periods of said device until said condition is satisfied.

20. In an absorption refrigeration system, a liquid transfer device having a predetermined period of operation, and means for causing one operation of said device or a plurality of successive operations of said device depending upon a condition in said system.

21. In an absorption refrigeration system including a liquid transfer device, mechanism including a movable element operative to determine a period of operation of said device with predetermined movement of said element, means to instigate operation of said device responsive to a condition in said system, and said mechanism being effective to terminate operation of said device with predetermined movement of said element provided said condition is satisfied.

22. In an absorption refrigeration system including a liquid transfer device, mechanism including a movable element operative to determine a period of operation of said device with predetermined movement of said element, means for instigating operation of said device responsive to a condition in said system and permitting one or a plurality of such periods of operation of said device to satisfy said condition, said movable element repeating its predetermined movement with each successive period of operation, and said mechanism being effective to terminate operation of said device when said condition is satisfied and at the conclusion of a period of operation determined by the predetermined movement of said element.

WALTER A. KUENZLI.